Aug. 30, 1966   F. J. CARON   3,269,284

SHOCK ABSORBING WHEEL

Filed March 23, 1964                                           2 Sheets-Sheet 1

INVENTOR.
Fred J. Caron
BY
Webster & Webster
ATTYS.

Aug. 30, 1966  F. J. CARON  3,269,284
SHOCK ABSORBING WHEEL
Filed March 23, 1964  2 Sheets-Sheet 2

United States Patent Office 3,269,284
Patented August 30, 1966

3,269,284
SHOCK ABSORBING WHEEL
Fred J. Caron, Citrus Heights, Calif., assignor to Pactor Corporation, West Sacramento, Calif., a corporation of California
Filed Mar. 23, 1964, Ser. No. 354,022
4 Claims. (Cl. 94—50)

This invention relates to, and it is a major object to provide, a novel, heavy duty, shock absorbing wheel especially designed—but not limited—for ground compacting purposes. Thus, the wheel in its present embodiment is illustrated in what is known generally as tamping or sheep's-foot type.

Another important object of the invention is to provide a shock absorbing wheel adapted to be mounted on a driven or non-driven axle of a compaction implement, and preferably one of the self-propelled type; the wheel being constructed so that all substantial shocks, resulting from the ground compacting action of the wheel or otherwise, will be absorbed or effectively damped within the unitary confines of such wheel. Consequently, no harmful nor damaging shocks or vibrations will be transmitted to the chassis or drive mechanism of an implement supported by wheels constructed in accordance with the present invention.

The shock absorbing medium of the wheel is a number of compressible and resilient blocks of rubber or the like which are incorporated with and actually form a part of the wheel, and an additional important object of the invention is to mount the blocks so that they may easily be removed and replaced, if necessary, as fatigue or wear of the blocks may require for the most efficient operation.

It is also an object of the invention to mount the blocks in such a way that they are mainly enclosed and protected from contact with exterior objects, without interfering with their shock absorbing action.

A further object of the invention is to provide a shock absorbing wheel which is designed for ease and economy of manufacture.

A still further object of the invention is to provide a practical, reliable, and durable shock absorbing wheel and one which is exceedingly effective for the purpose for which it is designed.

These objects are accomplished by means of such structure and relative arrangement of parts as will fully appear by a perusal of the following specification and claims.

Referring now more particularly to the drawings and to the characters of reference marked thereon, the wheel —in which the shock absorbing features which constitute my invention are incorporated—is indicated generally at 1. Such wheel preferably comprises a plurality of transversely spaced annular rim-forming rings 2, and fixed on and projecting outwardly from the periphery thereof are circumferentially spaced ground-engaging tamping or compacting pads 3; the pads 3 of adjacent rings 2 being staggered relative to each other as shown. The rings 2 are connected together in unitary relation, and at evenly circumferentially spaced intervals, by radial transversely extending plates 4 which project radially inward from the inner periphery of said rings 2. The plates 4 are suitably braced from the corresponding rings 2 by angular gussets 5.

Figure 2:
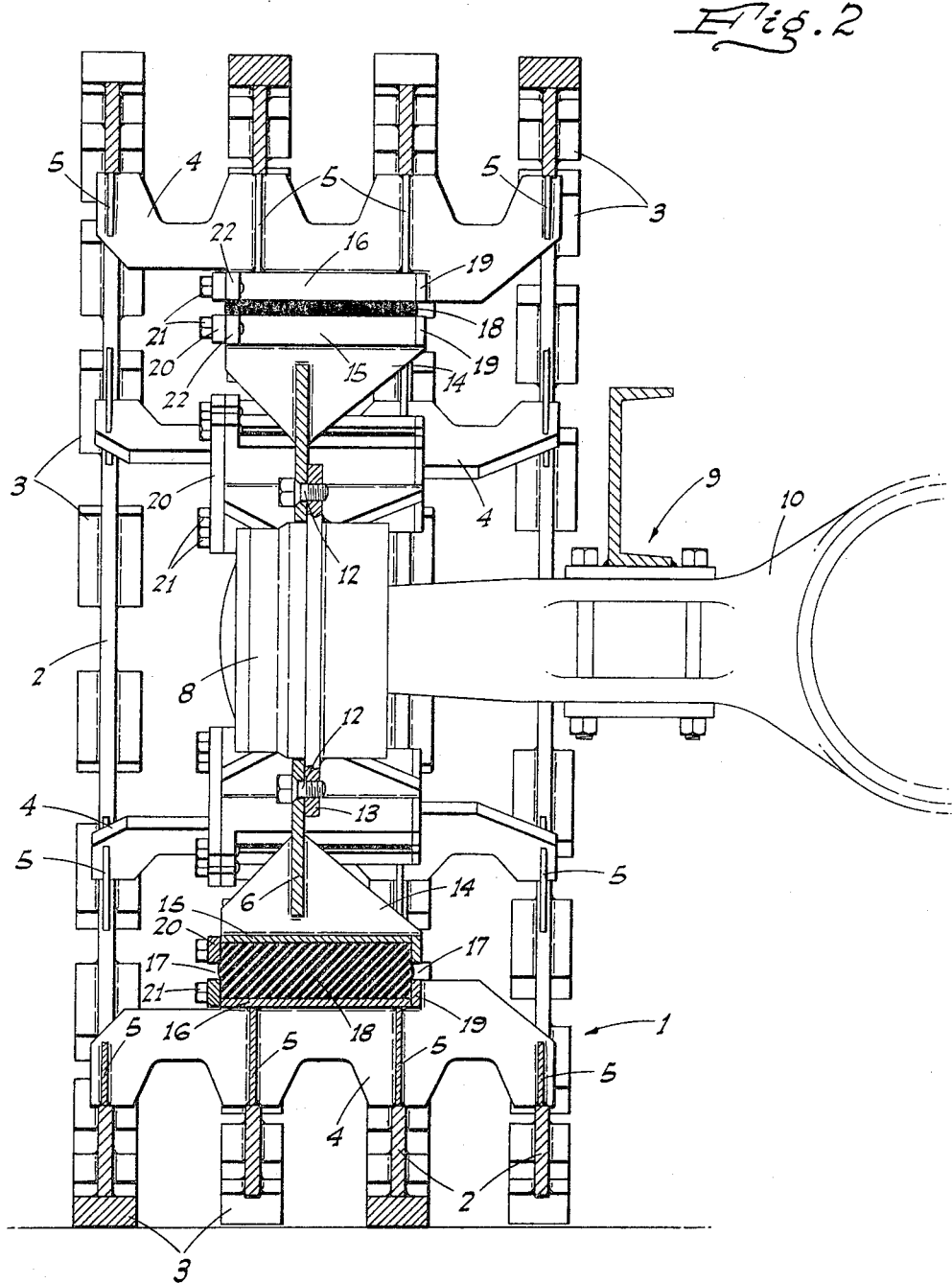
FIG. 2 is an enlarged transverse sectional elevation of the wheel; the view being taken on line 2—2 of FIG. 1, and the wheel shown as mounted in connection with an axle.

Spaced radially inward of the plates 4 is a single annular and relatively wide ring 6 disposed substantially centrally of the width of the wheel, as clearly shown in FIG. 2. The ring 6 is formed with a large central opening 7 of a size to closely surround a hub 8 which—in the present embodiment—is fixed on an axle (not shown) of a tractor, indicated generally at 9, and which axle is enclosed within a housing 10.

The central opening of the ring 6 is surrounded by a plurality of bolt holes 11 whereby said ring—and the wheel as a whole—is secured to the hub 8 by bolts 12 projected through said holes 11 and tapped matching holes in an outwardly projecting flange 13 on said hub.

Secured to and projecting radially out from the ring 6 are transversely extending plates 14 which are radially alined with but considerably shorter—transversely of the wheel—than the plates 4, and spaced some distance therefrom radially of the wheel; the plates 4 and 14 together forming the spokes of the wheel.

Figure 4:
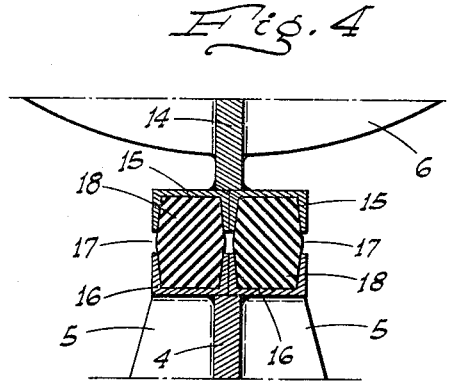
FIG. 4 is a fragmentary sectional elevation taken on line 4—4 of FIG. 3.

Secured on and projecting radially out from each plate 14 is a pair of transversely extending rigid channels 15. These channels 15 face radially out, with their adjacent side walls in matching engagement with each other, and with the plate 14 disposed centrally of the engaged channels, as clearly shown in FIG. 4.

A similar pair of channels 16 is secured on and projects radially inward from each corresponding plate 4; the channels 16 being disposed in facing and symmetrical relation to the channels 15 but spaced therefrom a relatively short distance radially of the wheel, as shown at 17.

A solid block 18 of heavy duty compressible and resilient material such as rubber or the equivalent fills each of the matching or registering ones of channels 15 and 16; said block thus also bridging the space 17 between said channels.

Figure 1:
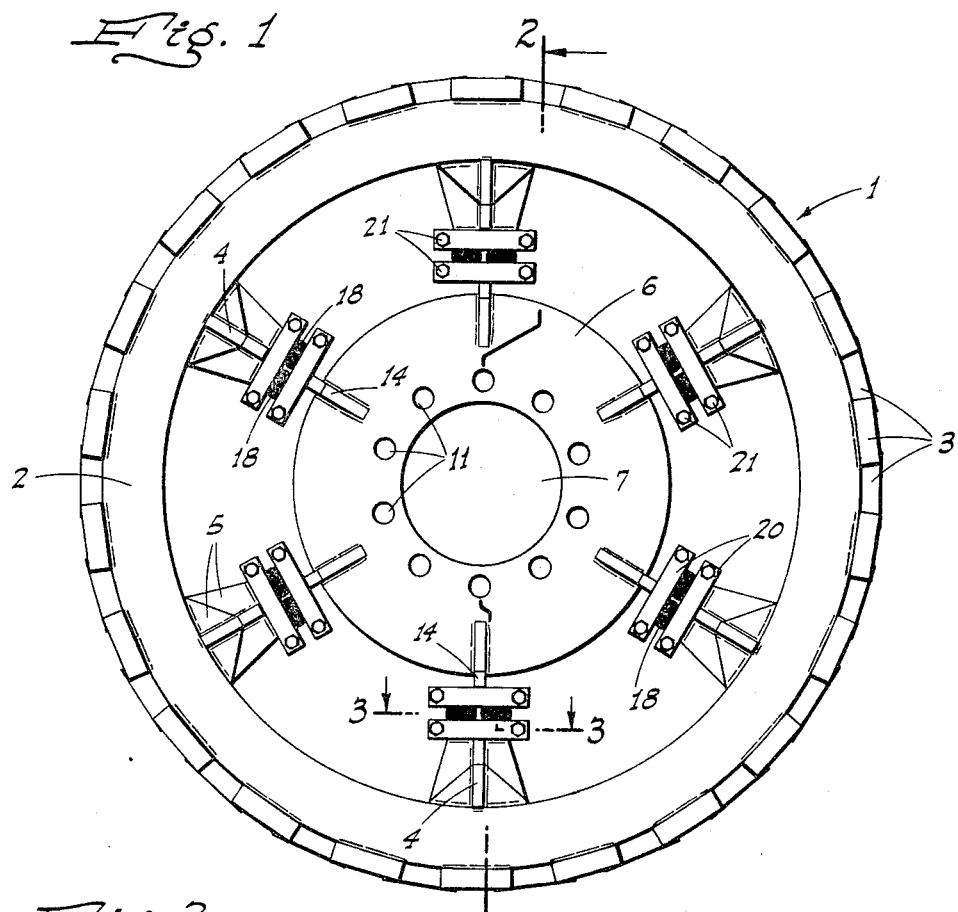
FIG. 1 is a front elevation of the shock absorbing wheel, detached.
Figure 3:
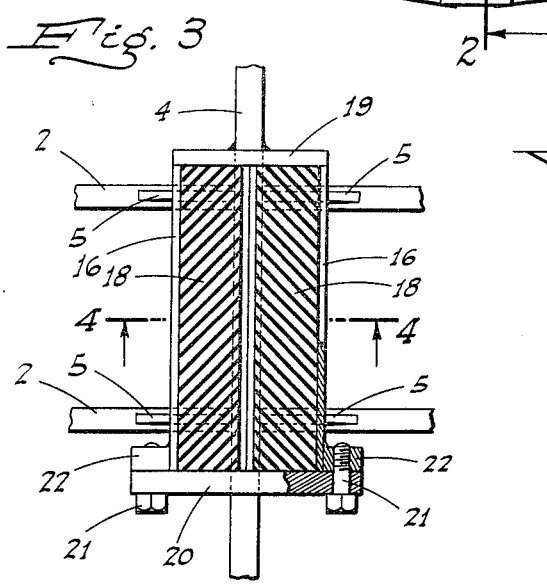
FIG. 3 is a further enlarged fragmentary sectional plan, taken on line 3—3 of FIG. 1.

Each block 18—which extends the full length of the corresponding registering channels 15 and 16—is removable therefrom by endwise sliding movement. To normally prevent such movement, while enabling each block 18 to be slid into or removed from place when desired, the following arrangement is provided:

Each pair of channels 15 and 16 is permanently closed at one end by cross bars 19 which leave the space 17 unobstructed. At the opposite end, each pair of channels 15 and 16 is normally closed by a removable cross bar 20. Each cross bar 20 is held in place by cap screws 21 projecting through the bar 20 adjacent its ends and threaded into ears 22 rigid with and projecting from the outer side walls of said channels, as shown in FIG. 3.

With the above described arrangement of parts, it will be seen that the wheel 1 comprises separate inner and outer rigid units connected together only by the rubber blocks 18. Such blocks not only transmit the rotative driving forces from the inner wheel unit to the outer ground engaging unit but also serve the more important function of providing shock absorbers between said wheel units.

Shocks imparted to the outer wheel unit from the ground compacting action of the wheel or the recurrent reversing of the drive, are effectively absorbed or damped and are not transmitted to the inner wheel unit and thence to the chassis or driving mechanism of the implement or tractor on which the wheel is mounted.

This desirable result obtains whether the shocks are in a radial, circumferential, or lateral direction.

As either or both of the blocks 18 of each pair are separately removable upon detachment of the corresponding and retaining cross bar 20, such block or blocks may be easily and quickly replaced when necessary due to fatigue or wear.

It may be here noted that single wide block-confining channels may be employed instead of the dual arrangement shown. It is believed, however, that the heavy shocks and torque strains are better taken by the rubber blocks of the present embodiment—by reason of the interposition of the rigid intermediate partition-forming side walls of the abutting channels—than would be the case if single, extra wide, facing channels, engaging about a single rubber block, were used. Also, the dual channel arrangement enables one block only to be removed and replaced if necessary, without the opposed registering channels becoming possibly misalined upon such removal of one block.

It is to be understood that while the wheel has been shown and described as being mounted on a driven axle, it may also be mounted on a non-driven or stationary axle with equally beneficial results.

Also, the wheel may be made sufficiently wide, or a number of them be assembled in side-by-side relation, to form a continuous compacting roller.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A ground engaging wheel comprising initially separate radially outer and inner units, a central ring included with the inner unit adapted for support from an axle, the outer unit including a plurality of transversely spaced rim rings, circumferentially spaced spoke-forming plates projecting radially in from the rim rings transversely of the wheel and tying said rim rings together, other spoke-forming plates projecting radially out from the first named ring in radial alinement with the first named plates but spaced therefrom, said first named ring being disposed substantially centrally of the width of the wheel, a transversely extending channel secured on each of the last named plates and facing radially out, a similar channel secured on each of the first named plates in opposed matching relation to the corresponding first named channel, the corresponding channels facing but being spaced from each other radially of the wheel, a compressible and resilient block in and filling said corresponding channels and the space therebetween, and cross bars closing the ends of the channels.

2. A wheel, as in claim 1, in which one of the cross bars on each channel is removable; the removable cross bars being at the same end of corresponding channels.

3. A ground engaging wheel comprising initially separate radially outer and inner units, a central ring included with the inner unit adapted for support from an axle, the outer unit including a rim ring, circumferentially spaced pairs of spoke-forming elements projecting toward each other from said rings in rigid relation, opposed rigid transversely extending channels secured to the adjacent ends of the spoke elements and disposed in facing relation, the channels being spaced from each other radially of the wheel a relatively short distance, a block of compressible and resilient material filling the opposed channels and the space therebetween, said block being insertible into and removable from said opposed channels by sliding movement laterally of the wheel, and means removably retaining the block in place in the channels.

4. A wheel, as in claim 3, in which said retaining means comprises a cross bar permanently closing each channel at one end, and a removable cross bar closing each channel at the other end.

References Cited by the Examiner
UNITED STATES PATENTS
3,108,519   10/1963   Domenighetti _____ 94—50
FOREIGN PATENTS
746,826   8/1944   Germany.
861,023   2/1961   Great Britain.

CHARLES E. O'CONNELL, *Primary Examiner.*

N. C. BYERS, *Assistant Examiner.*